(12) United States Patent
Becnel et al.

(10) Patent No.: US 11,251,881 B2
(45) Date of Patent: Feb. 15, 2022

(54) SYSTEM FOR RECURSIVE CALIBRATION OF A SENSOR NETWORK

(71) Applicant: UNIVERSITY OF UTAH RESEARCH FOUNDATION, Salt Lake City, UT (US)

(72) Inventors: Thomas Becnel, Salt Lake City, UT (US); Pierre-Emmanuel Gaillardon, Salt Lake City, UT (US); Kerry Elizabeth Kelly, Salt Lake City, UT (US)

(73) Assignee: UNIVERSITY OF UTAH RESEARCH FOUNDATION, Salt Lake City, UT (US)

( * ) Notice: Subject to any disclaimer, the term of this patent is extended or adjusted under 35 U.S.C. 154(b) by 75 days.

(21) Appl. No.: 16/888,270

(22) Filed: May 29, 2020

(65) Prior Publication Data
US 2021/0376937 A1 Dec. 2, 2021

(51) Int. Cl.
*G06F 15/16* (2006.01)
*H04B 17/11* (2015.01)
*H04L 67/12* (2022.01)
*H04L 67/00* (2022.01)
*H04L 41/12* (2022.01)

(52) U.S. Cl.
CPC .............. *H04B 17/11* (2015.01); *H04L 67/12* (2013.01); *H04L 67/34* (2013.01); *H04L 41/12* (2013.01)

(58) Field of Classification Search
CPC ......... H04B 17/11; H04L 67/12; H04L 67/34; H04L 41/12
See application file for complete search history.

(56) References Cited

U.S. PATENT DOCUMENTS

| 11,131,989 B2* | 9/2021 | Cella ................... G05B 23/0297 |
| 2009/0005666 A1* | 1/2009 | Shin ....................... A61B 5/6849 600/365 |
| 2010/0121602 A1* | 5/2010 | Souilmi ................ H04B 17/21 702/104 |
| 2020/0348662 A1* | 11/2020 | Cella .................... G05B 23/024 |

* cited by examiner

*Primary Examiner* — Normin Abedin
(74) *Attorney, Agent, or Firm* — Workman Nydegger

(57) ABSTRACT

A computer system for recursive calibration of a sensor network receives a first data communication from a first sensor node that is a neighbor to a calibrated sensor node. The computer system then updates a set of linear regressions between the first sensor node and a set of neighboring sensor nodes, which include the neighboring, calibrated sensor node. The computer system calibrates the first sensor node using an average of the set of linear regressions weighted by a correlation. When the first sensor node is calibrated, the computer system uses the calibrated first sensor node in calibration of a neighboring, uncalibrated sensor node. The computer system then gathers, at the first sensor node, a calibrated sensor reading.

20 Claims, 5 Drawing Sheets

200

---
Algorithm 1 Weighted Neighborhood Iterative Calibration
---
1: procedure WEIGHTEDNEIGHBORHOOD($\mathcal{G}$)
2:    for all $k$ discrete time steps do
3:       Create breadth-first queue
4:       while queue not empty do
5:          $n_i \leftarrow$ pop from queue
6:          for all $n_j$ in calibrated neighbors do
7:             if $n_j$ is gold standard then
8:                 $\Gamma_j \leftarrow \Gamma$
9:             $c_j \leftarrow \text{RLS}(d_{i,k}, x_{j,k})$
10:            $r_j \leftarrow \text{SAMPLECORR}(d_{i,k}, x_{j,k})$
11:            $v_j \leftarrow \text{DISTWEIGHT}(n_i, n_j)$
12:         $w \leftarrow r \cdot v \cdot \Gamma$
13:         $\alpha, \beta \leftarrow \text{Mean}(c, w)$

*FIG. 2*

SYSTEM FOR RECURSIVE CALIBRATION OF A SENSOR NETWORK

GOVERNMENT RIGHTS

This invention was made with government support under grant no. 1646408 awarded by the National Science Foundation. The government has certain rights in the invention.

BACKGROUND

Computers and computing systems have affected nearly every aspect of modern living. Computers are generally involved in work, recreation, healthcare, transportation, entertainment, household management, etc. Computer systems have also played an increasing role in gathering and processing environmental data from sensors. For example, air pollution has become a growing problem around the world. Many cities and towns have established networks of pollution sensors to gather information relating to the air pollution in and around the city or town.

In many places, low-cost sensor networks have become a common solution for monitoring large heterogeneous environmental events for long periods of time, given their ability to cover large areas and collect measurements with high resolution. These low-cost sensor networks provide a wealth of data, but due to the nature of the low-cost sensors themselves, the process of calibrating each individual sensor can be both time consuming and fraught with potential for error. Accordingly, there is a need in the art for innovations to improve the usage and reliability of sensors.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments include methods and computer systems for recursive calibration of a sensor network. For example, the computer system receives a first data communication from a first sensor node that is a neighbor to a calibrated sensor node. The computer system then updates a set of linear regressions between the first sensor node and a set of neighboring sensor nodes, which include the neighboring, calibrated sensor node. The computer system calibrates the first sensor node using an average of the set of linear regressions weighted by a correlation. When the first sensor node is calibrated, the computer system uses the calibrated first sensor node in calibration of the neighboring, uncalibrated sensor node. The computer system then gathers, at the first sensor node, a calibrated sensor reading.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings described below.

FIG. 2 illustrates pseudo-code of an algorithm for calibration of sensor nodes within a sensor network.

DETAILED DESCRIPTION

As sensor networks have become an increasingly common means to gather environmental data, such as pollution data, there has been an increased need for efficient and accurate methods and systems for calibrating the sensor nodes within the sensor network. As such, disclosed embodiments teach a method and computer system for recursive calibration of a sensor network. The computer system is configured to receive data from one or more neighboring sensor nodes and to calibrate the sensor nodes using the received information. This process is continued until all, or nearly all, sensor nodes within the sensor network are calibrated.

As used herein, unless specified explicitly, "sensors" and "sensor nodes" are interchangeable. In general, a "sensor node" refers to the sensor in the context of the sensor network, whereas as "sensor" refers to the individual sensor outside the context of the sensor network. Similarly, as used herein the "sensor network" comprises any collection of two or more sensor nodes that are directly or indirectly in communication with each other.

One of skill in the art will appreciate that these sensors each possess some intrinsic gain and offset when sampling data. Conventionally, the gain value and offset value are calibrated in a laboratory environment before deployment. However, these offline calibrations are not ideal because a sensor network may span a broad land use model, covering urban, industrial, suburban, and geographically diverse regions. Each region produces a unique makeup of airborne particles, and will therefore produce different mappings of the sensor measurements to the actual data. Consequently, static offline calibrations can misrepresent the actual online calibration of a sensor. Accordingly, disclosed embodiments teach systems and methods for calibrating sensor nodes online in order to account for the inevitable change of the calibration over time, due to drift and changing environmental factors.

Disclosed embodiments include a novel online calibration scheme that leverages sparse but highly accurate data from one or more ground-truth references (such as a federally maintained "Golden Standard" particle counter in the case of air pollution monitoring) to seed the calibration of a distributed sensor network. As used herein, a "ground-truth reference" or a "golden standard" refers to a trusted source of sensor data that is assumed to be correct. Additionally, the disclosed calibration system may be referred to as the "weighted neighborhood calibration algorithm." The disclosed system utilizes the correlation and distance between sensors to compensate for the heterogeneous and dynamic environment in which the sensors are sampling. By implementing a localized Recursive Least Squares (RLS) algorithm on each sensor node, sensor nodes may estimate a linear regression based on stimulus data from their calibrated neighbors at an arbitrary time step.

Figure 1:
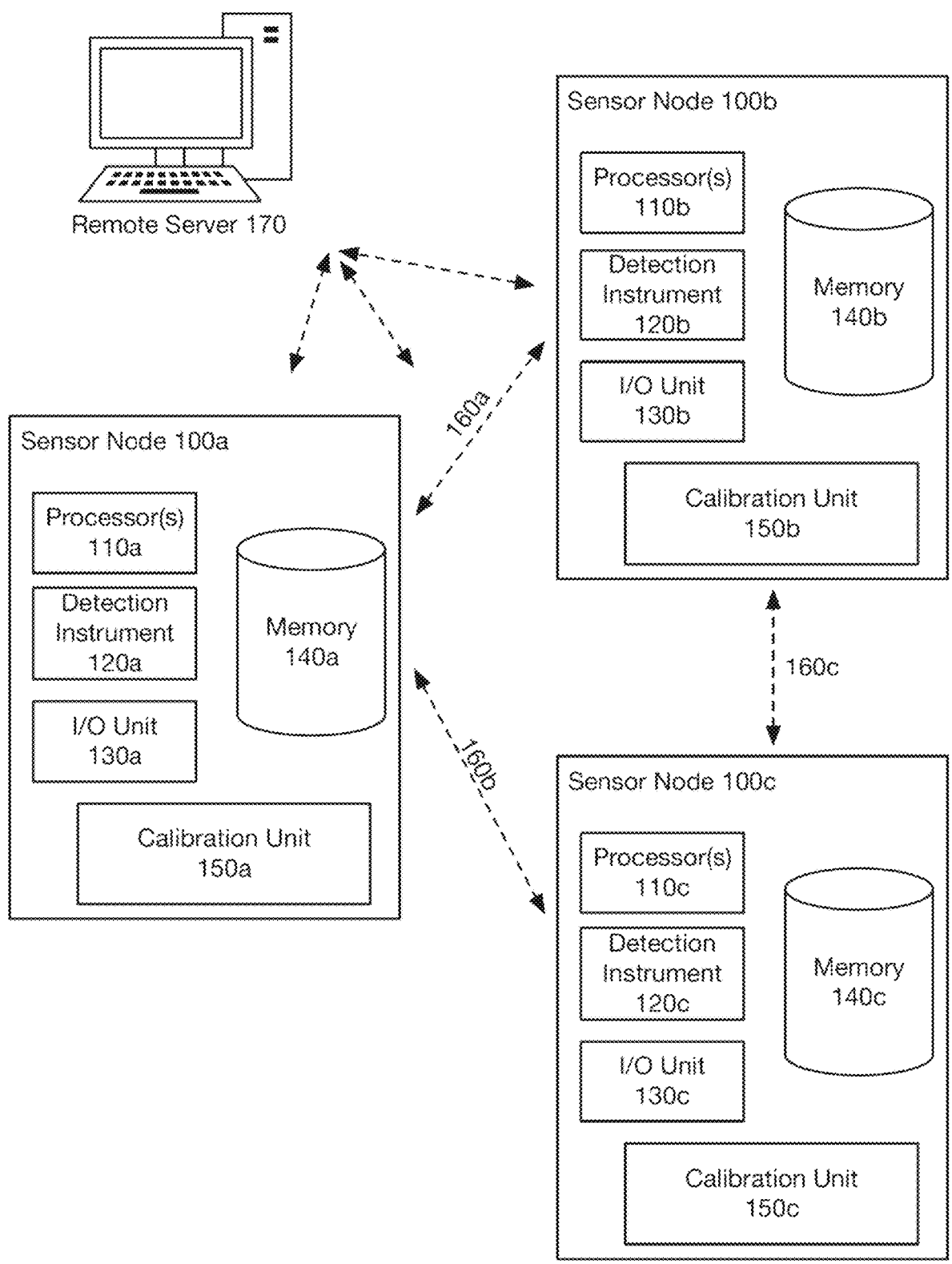
FIG. 1 illustrates a schematic diagram of an example network of sensor nodes.

Turning now to the figures, FIG. 1 illustrates a schematic diagram of an example network of sensor nodes. In the depicted embodiment, the label 100 is used to indicate a general "sensor node" whereas a label such as 100a indicates a specific sensor node within a sensor network. As indicated in FIG. 1, each sensor node 100(a-c) comprises one or more processors 110(a-c), one or more detection instruments 120(a-c), an I/O Unit 130(a-c) for network communication, memory 140(a-c), and a calibration unit 150a. The detection instrument 120 may comprise an apparatus capable of detecting environmental data of interest. For example, the detection instrument 120 may include various pollution sensors.

FIG. 1 also depicts a remote server 170. The remote server 170 may comprise a single computer processor or multiple computer processors. The remote server 170 may individually or in combination with other processing units perform the entirety or a portion of the calibration process disclosed herein. Similarly, the calibration units 150(a-c) may individually or in combination with other processing units perform the entirety or a portion of the calibration process disclosed herein. Accordingly, as used herein the "computer system" refers to any combination, individually or together, of the remote server 170, the calibration units 150(a-c), the processor(s) 110(a-c), or any other processing device that performs a function in the calibration process disclosed herein. One of skill in the art will appreciate that in today's highly networked world, computational functions can be performed at nearly any location with an assortment of different processing units.

As used herein, a "module" or "unit" comprises computer executable code and/or computer hardware that performs a particular function. One of skill in the art will appreciate that the distinction between different modules is at least in part arbitrary and that modules may be otherwise combined and divided and still remain within the scope of the present disclosure. As such, the description of a component as being a "module" or "unit" is provided only for the sake of clarity and explanation and should not be interpreted to indicate that any particular structure of computer executable code and/or computer hardware is required, unless expressly stated otherwise. In this description, the terms "component", "agent", "manager", "service", "engine", "virtual machine" or the like may also similarly be used.

As exemplary sensor node 100 that is spatially static gathers sensor data of a continuous, stochastic and heterogeneous time dependent signal, which may be an environmental measurand, such as temperature, humidity, pollution, etc. The sensor data can be defined as a discrete-time signal: $d_k = \alpha x_k + \beta + z_k$ where $d_k$ is the observed signal, $x_k$ is the environmental measurand, $\alpha$ is the ideal gain value and $\beta$ the offset value of the detection instrument 120, and $z_k$ is a normally distributed Gaussian noise with zero mean, representing the environmental and measurement noise.

In view of FIG. 1, one will appreciate that the above description of the sensor data can equally be applied to each n sensor nodes (e.g., sensor nodes 100(a-c)) within the sensor network. As such, each sensor node collects its own set of measurements, $d_{i,k}$. The computer system of equations relating to these n sensors may be overdetermined because of the additive noise, and may be iteratively estimated. In at least one embodiment, the calibration units 150(a-c) within each sensor node 100(a-c) utilize the Recursive Least Squares (RLS) filter, which iteratively approximates the gain and offset parameters as new measurements are added to the computer system.

In at least one embodiment, the calibration units 150(a-c) operate under the assumption that the n sensor nodes form a graph ($\mathcal{G}$). Further, the calibration units 150(a-c) operate under the assumption that the various sensor nodes 100(a-c) are connected through edges 160(a-c) if the Euclidean distance between the respective sensor nodes 100(a-c) is less than some radius r. This causes the calibration units 150(a-c) to only consider the physical neighbors of a sensor node 100(a-c). In various embodiments it is not necessary for each sensor node 100(a-c) to comprise a direct connection to every other sensor node 100(a-c). Instead, in some embodiments, the sensor nodes 100(a-c) may form connections such as a mesh network.

Figure 3:
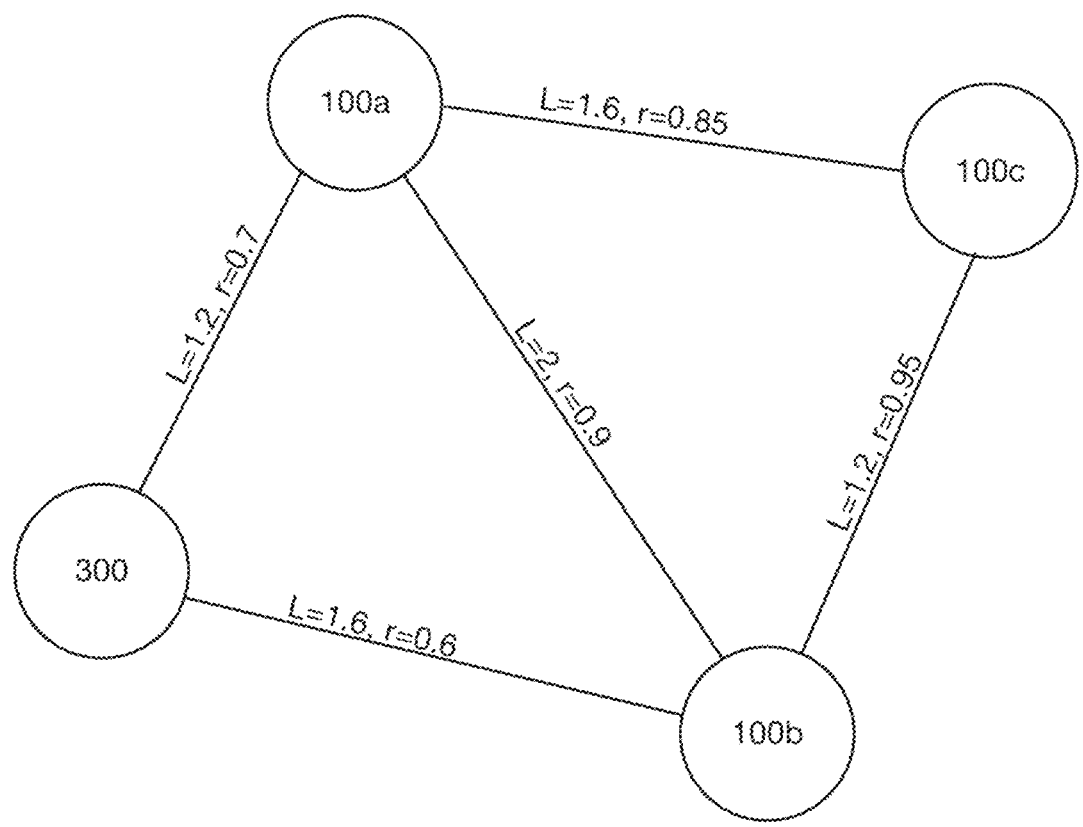
FIG. 3 illustrates a schematic of a sensor node network.

FIG. 2 illustrates pseudo-code of a weighted neighborhood calibration algorithm 200 for calibration of sensor nodes within a sensor network. The weighted neighborhood calibration algorithm 200 is a 2-step algorithm in which calibration is percolated through the network in a breadth-first manner. FIG. 3 illustrates a schematic of the sensor node network with the inclusion of a gold standard sensor node 300. The weighted neighborhood calibration algorithm 200 starts at a gold standard sensor node 300 and calibrates sensor nodes 100(a-c) sequentially. In the first step, the calibration unit 150a in sensor node 100a updates a linear regression between itself and its already calibrated neighbors, which in this example would include at least the gold standard sensor node 300. In the second step, the calibration unit 150a computes an average of these regressions, weighted by correlation, distance, and sensor type. Once calibrated, the sensor node 100a can be used as a reference for calibration by its neighbors (e.g., sensor node 100b and sensor node 100c).

The computer system initiates weighted neighborhood calibration algorithm 200 by constructing a breadth-first queue containing the nodes in $\mathcal{G}$, with no duplicates, with the head of the queue being the node closest in distance to the gold standard sensor node, as shown in Step 3. This queue will be reinitialized and emptied at Step 2. The computer system assumes the gold standard sensor node, which we denote as $n_{GS}$, to be a calibrated node that perfectly measures the local stimulus.

The current sensor node popped from the head of the queue, as shown in Step 5, is referred to as $n_i$. There exists at least one neighbor of $n_i$ that has already been calibrated at time step k. In the case of the completely full queue, the calibrated neighbor corresponds to $n_{GS}$. Within the weighted neighborhood calibration algorithm 200 there are m of these calibrated neighbors. Sensor node $n_i$ updates the RLS between itself and every one of its calibrated neighbors. The computer system then obtains a set of m linear regression equations, each containing gain ($\alpha$) and offset ($\beta$) parameters, as shown in Step 9.

At each iteration, the computer system receives a first data communication, such as $d_k$, from a sensor node (e.g., sensor node 100a) that is a neighbor to a calibrated sensor node.

The computer system then uses $d_k$ as inputs to the algorithm. As used herein, $d_k$ is the measured value of $n_i$ at time step k, and the vector $[x_j, 1]$, where $x_j$ is the measurement from neighbor $n_j$ after passing it through the current calibration equation for $n_j$. The computer system updates a set of linear regressions between the first sensor node 100a and a set of neighboring sensor nodes, which include the neighboring, calibrated sensor node. The vector of linear regressions is referred to as c. The RLS algorithm is denoted as RLS in Algorithm 1. Now that node $n_i$ has a set of calibration estimates from its neighbors, the computer system scores the importance of these estimates to better capture the dynamics of the environment.

In calculating the weighting in the weighted neighborhood calibration algorithm 200, the computer system considers three influences that impact the weighting. First, the computer system calculates a skewing towards data received from the gold standard sensor node 300. As such, the weight in c corresponding to the edge $(n_i, n_{GS})$ is heavily skewed to ensure a large portion of the calibration comes from here. The gain applied to $c_{GS}$ is referred to as $\lceil$. The vector $\lceil$ is defined as the all-ones vector with $\lceil_{GS}=\lceil$.

As a second influence on the weighting, the computer system calculates a correlation based weighting. For instance, the computer system may weight the average of the set of linear regressions by the correlation that comprises applying a Pearson correlation on an edge connecting the neighboring, calibrated sensor node and the first sensor node within a graph. For example, the computer system weights each element in c according to the Pearson correlation on the edge $(n_i, n_j)$. In this way, estimates from highly correlated neighbors will be trusted more, and uncorrelated neighbors can be removed from the estimate. This is accomplished recursively using an iterative version of the Pearson correlation, called the sample correlation coefficient. The computer system calculates this in an identical fashion to the RLS and obtains the vector r. This weighting is denoted as SAMPLECORR in the weighted neighborhood calibration algorithm 200, and is referenced in Step 10.

As a third influence on the weighting, the computer system calculates a correlation distance between sensor nodes 100. Highly heterogeneous environments may exhibit poor correlation on an edge. To this end the weighted neighborhood calibration algorithm 200 can include distance based weighting. Neighbors that are closer together will have a higher distance weight metric than neighbors at the edge of the communication range. As such, the computer system may weight the average of the set of linear regressions by distance by calculating a higher gain for sensor nodes selected from the set of neighboring sensor nodes that are closer to the first sensor node 100a and a relatively lower gain for sensor nodes selected set of neighboring sensor nodes that are further away from the first sensor node 100a.

This gain parameter is calculated as $(r/l)^2$, where r is the maximum communication radius and l is the Euclidean distance between sensors. The distance based weight vector is referred to as v. An artificial bounding condition, $\lambda$, may be utilized where $0<\lambda<1$ and $[r\cdot\lambda<l<r]$, to keep values in v reasonably constrained. Without the inclusion of $\lambda$ co-located sensors may be completely dominated by proximity measurement, so l is limited to a degree. This weighting is denoted as DISTWEIGHT in weighted neighborhood calibration algorithm 200, and is referenced in Step 11.

A resulting weight vector w is then calculated by the element-wise product of the three vectors: $w=\lceil \cdot r \cdot v$. In at least one embodiment, the computer system calibrates the first sensor node using an average of the set of linear regressions weighted by a correlation. For example, the computer system computes the weighted average of c using w as the weighting, as shown in Steps 12-13:

$$[\alpha\beta] = \frac{1}{\sum w} c \cdot w$$

Additionally or alternatively, the computer system may calculate an average of the set of linear regressions weighted by only correlation and distance.

Now $(\alpha,\beta)$ are the new calibration parameters for node $n_i$ and ni can be used as a calibrated neighbor for the next node in the network. As such, in at least one embodiment, when the first sensor node 100a is calibrated, the computer system uses the calibrated, first sensor node 100a in calibration of the neighboring, uncalibrated sensor node. Once calibrated, the sensor network can gather, at sensor node 100a, a calibrated sensor reading.

Returning to FIG. 3, FIG. 3 illustrates a simple example sensor node network. As an example of the weighted neighborhood calibration algorithm 200 applied to FIG. 3, L refers to the Euclidean distance between nodes, and r refers to the Pearson correlation between sensor nodes 100(a-c) and 300. In this example, the following values for each sensor node are considered ideal values calibration values, which are unknown to the model—sensor node 100a: $\alpha=1.5$, $\beta=2$, $d=3.5$; sensor node 100b: $\alpha=3$, $\beta=-0.5$, $d=2.5$; sensor node 100c: $\alpha=2.5$, $\beta=-2$, $d=0$; gold standard sensor node 300: $d=1$. In this example, d refers to the value measured by the sensor. The example arbitrarily defines the maximum radius as $r=2.5$.

In this example and as indicated in the weighted neighborhood calibration algorithm 200 shown in FIG. 2, the computer system begins by queuing a list of nodes in a breadth-first approach, with sensor node 100a as the head because it is closest to the gold standard sensor node 300. The queue takes the form of Q={sensor node 100a, sensor node 100b, sensor node 100c}. Calibration unit 150a then computes one iteration of RLS with gold standard sensor node 300: $RLS(d_A=3.5, x_{Gs}=1)=[1.5, 2]$.

Because there are no other calibrated neighbors of sensor node 100a, the computer system pops sensor node 100b from the queue. Both GS and sensor node 100a are calibrated neighbors, so the computer system computes one iteration of RLS with both: $RLS(d_B=2.5, x_{GS}=1)=[3, -0.5]$. Sensor node 100b receives the calibrated measurement from sensor node 100a as input: $x_A=(d_A-\beta_A)/\alpha_A=1$. The calibration unit 150b then calculates $RLS(d_B=2.5, x_A=1)=[3, -0.5]$. Sensor node 100b also updates the correlation and distance with GS and A: $r_B=[0.6, 0.9]$; $v_B=[(2.5/1.6)^2, (2.5/2)^2]$.

In this example, the gold standard weight is $\lceil=10$, so that $\lceil_B=[10, 1]$. The weight vector is then $w_B=[14.65, 1.4]$, and the normalized calibration parameters are $\alpha=(3*14.65+3*1.4)/(14.65+1.4)=3$ and $\beta=(-0.5*14.65+-0.5*1.4)/(14.65+1.4)=-0.5$. sensor node 100a and sensor node 100b can then be used to calibrate sensor node 100c in the same fashion. It should be noted that in the case of this example, the gain and offset values are calculated perfectly because of the absence of noise in the computer system.

Figure 4:
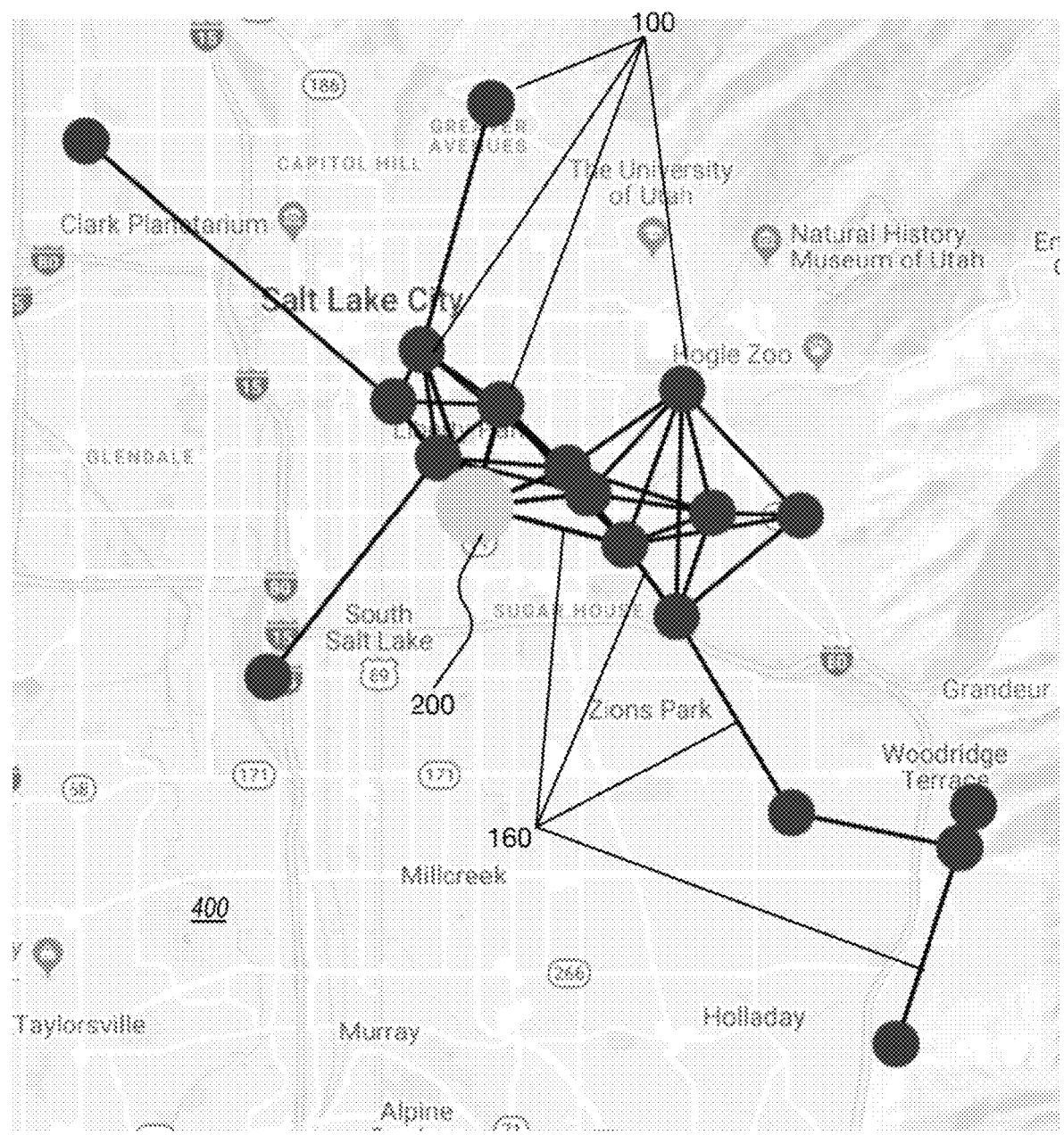
FIG. 4 illustrates a sensor node network layout over a city.

FIG. 4 illustrates a sensor node network layout over a city. Embodiments of the disclosed system provide a novel innovation relating to the calibration of sensor networks. In particular, disclosed embodiments teach a sensor network that can self-calibrate in the field. As depicted in FIG. 4, an actual deployed sensor network may comprise sensors that are distributed across a large geographic area with a variety of different local environments and conditions. Disclosed embodiments provide improvements that increase the accuracy of the resulting sensor data and decrease the time and cost associated with laboratory calibration of sensors.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
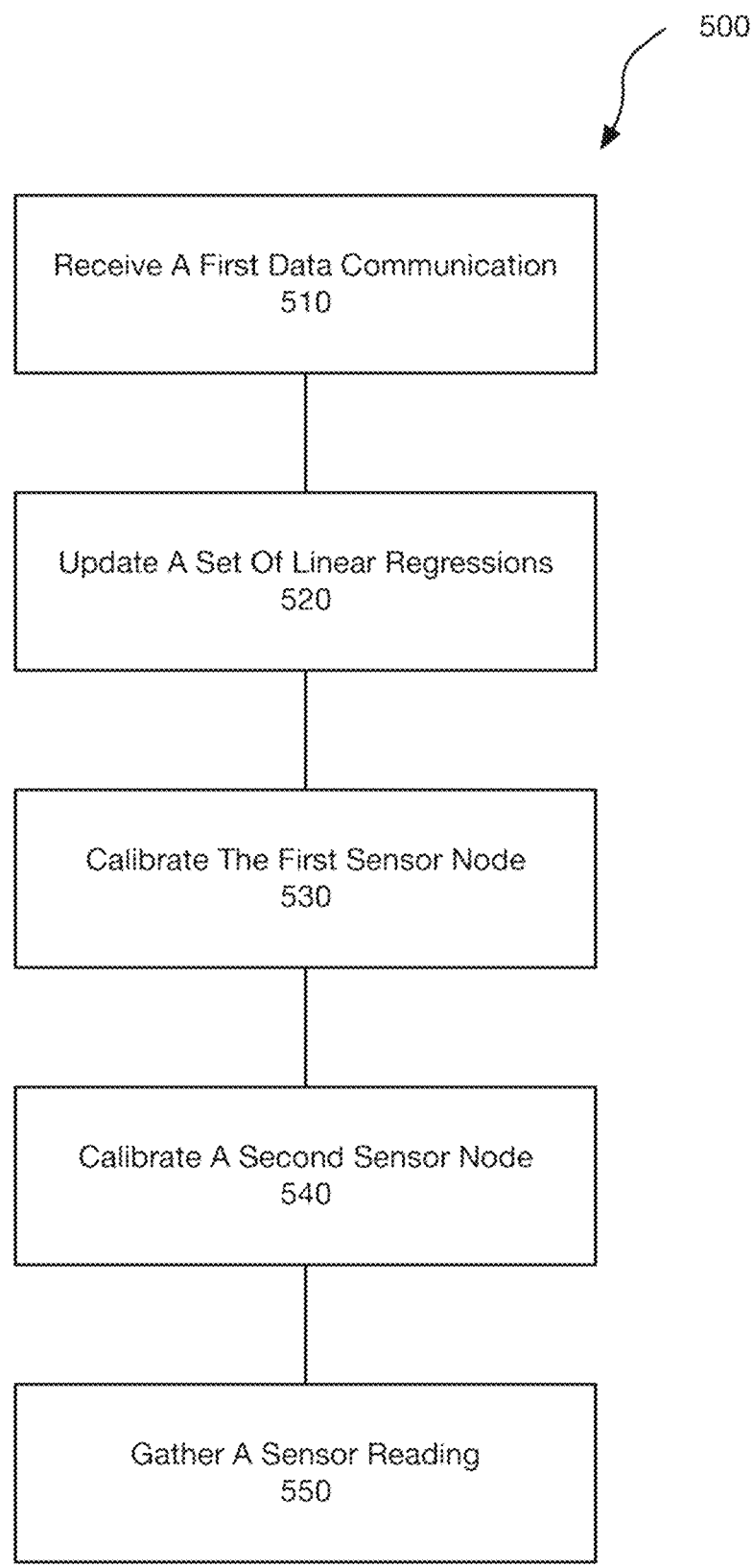
FIG. 5 illustrates a flowchart of steps in a method for calibrating a sensor node network.

FIG. 5 illustrates a flowchart of steps in a method 500 for calibrating a sensor node network. The method includes an act 510 of receiving a first data communication. Act 510 comprises receiving a first data communication from a first sensor node that is a neighbor to a calibrated sensor node. For example, as shown and described with respect to FIG. 3, the computer system receives a data communication from the first sensor node 100*a*, which is a neighbor to the calibrated sensor node, gold standard sensor node 300.

Additionally, method 500 includes an act 520 of updating a set of linear regressions. Act 520 comprises updating a set of linear regressions between the first sensor node and a set of neighboring sensor nodes, which include the neighboring, calibrated sensor node. For example, as shown and described with respect to FIG. 2, the weighted neighborhood calibration algorithm 200 updates a set of linear regressions, c.

The method 500 also includes an act 530 of calibrating the first sensor node 100*a*. Act 530 comprises calibrating the first sensor node 100*a* using an average of the set of linear regressions weighted by a correlation. For example, as shown and described with respect to FIG. 2, the weighted neighborhood calibration algorithm 200 calculates a gain value, $\alpha$, and offset value, $\beta$, using an average of the linear regressions, c, weighting by a correlation, $r_j$.

Further, method 500 includes an act 540 of calibrating a second sensor node. Act 540 comprises, when the first sensor node is calibrated, using the calibrated first sensor node in calibration of the neighboring, uncalibrated sensor node. For example, as shown and described with respect to FIGS. 2 and 3, the computer system recursively uses each newly calibrated sensor node for calibration of neighboring uncalibrated sensor nodes.

Further still, method 500 includes an act 550 of gathering a sensor reading. Act 550 comprises gathering, at the first sensor node, a calibrated sensor reading. For example, as depicted and described with respect to FIGS. 3 and 4, the sensor network is able to gather accurate measurements once the calibration process is complete.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Computing system functionality can be enhanced by a computing systems' ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Cloud and remote based service applications are prevalent. Such applications are hosted on public and private remote systems such as clouds and usually offer a set of web based services for communicating back and forth with clients.

Many computers are intended to be used by direct user interaction with the computer. As such, computers have input hardware and software user interfaces to facilitate user interaction. For example, a modern general purpose computer may include a keyboard, mouse, touchpad, camera, etc. for allowing a user to input data into the computer. In addition, various software user interfaces may be available.

Examples of software user interfaces include graphical user interfaces, text command line based user interface, function key or hot key user interfaces, and the like.

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium.

Transmissions media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system for recursive calibration of a sensor network, comprising:
   one or more processors; and
   one or more computer-readable media having stored thereon executable instructions that when executed by the one or more processors configure the computer system to perform at least the following:
   receive a first data communication from a first sensor node that is a neighbor to a calibrated sensor node;
   update a set of linear regressions between the first sensor node and a set of neighboring sensor nodes, which include the neighboring, calibrated sensor node;
   calibrate the first sensor node using an average of the set of linear regressions weighted by a correlation;
   when the first sensor node is calibrated, use the calibrated first sensor node in calibration of a neighboring, uncalibrated sensor node; and
   gather, at the first sensor node, a calibrated sensor reading.

2. The computer system of claim 1, wherein the neighboring, calibrated sensor node comprises a gold standard sensor node.

3. The computer system of claim 1, wherein weighting the average of the set of linear regressions by the correlation comprises applying a Pearson correlation on an edge connecting the neighboring, calibrated sensor node and the first sensor node within a graph.

4. The computer system of claim 1, wherein the executable instructions include instructions that are executable to configure the computer system to calculate an average of the set of linear regressions weighted by correlation and distance.

5. The computer system of claim 4, wherein weighting the average of the set of linear regressions by distance comprises calculating a higher gain for sensor nodes selected from the set of neighboring sensor nodes that are closer to the first sensor node and a relatively lower gain for sensor nodes selected from the set of neighboring sensor nodes that are further away from the first sensor node.

6. The computer system of claim 1, wherein the executable instructions include instructions that are executable to configure the computer system to:
   construct a breadth-first queue comprising a collection of sensor nodes, wherein the collection of sensor nodes includes the first sensor node, the neighboring, calibrated sensor node, and the set of neighboring sensor nodes.

7. The computer system of claim 6, wherein the neighboring, calibrated sensor node is the sensor node closest in distance to a gold standard sensor node.

8. The computer system of claim 6, wherein the recursive calibration of the sensor network continues until each sensor node within the breadth-first queue has been calibrated.

9. The computer system of claim 1, wherein calibrating the first sensor node comprises calculating an offset value and a gain value specific to the first sensor node.

10. The computer system of claim 1, wherein the first sensor node comprises a pollution sensor.

11. A method, executed on one or more processor, for recursive calibration of a sensor network comprising:
   receiving a first data communication from a first sensor node that is a neighbor to a calibrated sensor node;
   updating a set of linear regressions between the first sensor node and a set of neighboring sensor nodes, which include the neighboring, calibrated sensor node;
   calibrating the first sensor node using an average of the set of linear regressions weighted by a correlation;

when the first sensor node is calibrated, using the calibrated first sensor node in calibration of a neighboring, uncalibrated sensor node; and gathering, at the first sensor node, a calibrated sensor reading.

12. The method of claim 11, wherein the neighboring, calibrated sensor node comprises a gold standard sensor node.

13. The method of claim 11, wherein weighting the average of the set of linear regressions by the correlation comprises applying a Pearson correlation on an edge connecting the neighboring, calibrated sensor node and the first sensor node within a graph.

14. The method of claim 11, further comprising calculating an average of the set of linear regressions weighted by correlation and distance.

15. The method of claim 14, wherein weighting the average of the set of linear regressions by distance comprises calculating a higher gain for sensor nodes selected from the set of neighboring sensor nodes that are closer to the first sensor node and a relatively lower gain for sensor nodes selected from the set of neighboring sensor nodes that are further away from the first sensor node.

16. The method of claim 11, further comprising:

Constructing a breadth-first queue comprising a collection of sensor nodes, wherein the collection of sensor nodes includes the first sensor node, the neighboring, calibrated sensor node, and the set of neighboring sensor nodes.

17. The method of claim 16, wherein the neighboring, calibrated sensor node is the sensor node closest in distance to a gold standard sensor node.

18. The method of claim 16, wherein the recursive calibration of the sensor network continues until each sensor node within the breadth-first queue has been calibrated.

19. The method of claim 11, wherein calibrating the first sensor node comprises calculating an offset value and a gain value specific to the first sensor node.

20. A computer program product comprising one or more computer storage media having stored thereon computer-executable instructions for recursive calibration of a sensor network, the computer-executable instructions, when executed at a processor, configure a computer system to:

receive a first data communication from a first sensor node that is a neighbor to a calibrated sensor node;

update a set of linear regressions between the first sensor node and a set of neighboring sensor nodes, which include the neighboring, calibrated sensor node;

calibrate the first sensor node using an average of the set of linear regressions weighted by a correlation;

when the first sensor node is calibrated, use the calibrated first sensor node in calibration of a neighboring, uncalibrated sensor node; and gather, at the first sensor node, a calibrated sensor reading.

* * * * *